United States Patent
Landers et al.

(10) Patent No.: US 9,421,825 B2
(45) Date of Patent: *Aug. 23, 2016

(54) GEODESIC BELTED TIRE

(75) Inventors: Samuel Patrick Landers, North Canton, OH (US); Thulasiram Gobinath, Hudson, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 1017 days.

This patent is subject to a terminal disclaimer.

(21) Appl. No.: 12/955,124

(22) Filed: Nov. 29, 2010

(65) Prior Publication Data

US 2011/0146876 A1    Jun. 23, 2011

Related U.S. Application Data

(60) Provisional application No. 61/289,777, filed on Dec. 23, 2009.

(51) Int. Cl.
*B60C 9/18* (2006.01)
*B60C 9/20* (2006.01)
(Continued)

(52) U.S. Cl.
CPC ............ *B60C 9/023* (2013.01); *B29D 30/1635* (2013.01); *B29D 30/70* (2013.01); *B60C 9/06* (2013.01); *B60C 9/07* (2013.01); *B60C 9/08* (2013.01); *B60C 9/20* (2013.01); *B60C 15/0018* (2013.04); *B29D 2030/082* (2013.01); *B60C 9/263* (2013.04); *B60C 2009/0491* (2013.04); *B60C 2009/2025* (2013.04); *B60C 2009/2035* (2013.04)

(58) Field of Classification Search
CPC ............ B60C 9/20; B60C 9/023; B60C 9/07; B60C 2009/0491; B60C 2009/2025; B60C 2009/2032; B60C 2009/2035; B60C 15/0018; B60C 9/263; B29D 30/16; B29D 30/1635; B29D 30/70; B29D 2030/082; Y10T 152/10783; Y10T 152/10765; Y10T 152/10873
USPC ................ 152/526, 562, 561, 557, 533, 550; 156/117, 133, 397

See application file for complete search history.

(56) References Cited

U.S. PATENT DOCUMENTS 1,930,764 A    10/1933    Mallory
2,432,630 A    12/1947    Purdy
(Continued)

FOREIGN PATENT DOCUMENTS

AU    481576 B2    3/1975
FR    1141940    9/1957
(Continued)

OTHER PUBLICATIONS

European Search Report, dated Mar. 16, 2011.

*Primary Examiner* — Adrienne C Johnstone
(74) *Attorney, Agent, or Firm* — June E. Rickey (57) ABSTRACT

A pneumatic tire having a pair of beads, a tread, a pair of sidewalls, and a carcass including a plurality of plies of tire cord fabric, said tire having one or more belt plies, wherein at least one of said belt plies has cords being defined by the equation $\rho[\cos \alpha]^n = K$, when $\rho$ is the radius from the rotational axis of the tire to a point on the carcass, $\alpha$ is the cord angle of said at least one ply at said point, n is a positive real number between 0.1 and 1, and K is a constant.

14 Claims, 12 Drawing Sheets

(51) Int. Cl.
  B60C 15/00 (2006.01)
  B60C 9/07 (2006.01)
  B29D 30/70 (2006.01)
  B29D 30/16 (2006.01)
  B60C 9/02 (2006.01)
  B60C 9/06 (2006.01)
  B60C 9/08 (2006.01)
  B60C 9/26 (2006.01)
  B29D 30/08 (2006.01)

(56) References Cited

U.S. PATENT DOCUMENTS

| | | | |
|---|---|---|---|
| 2,518,967 A | 8/1950 | Witt | |
| 2,703,128 A | 3/1955 | Darrow | |
| 2,782,830 A | 2/1957 | Wallace | |
| 2,906,314 A | 9/1959 | Trevaskis | |
| 3,062,258 A | 11/1962 | Maiocchi | |
| 3,112,234 A | 11/1963 | Krupp | |
| 3,165,138 A | 1/1965 | Manchetti et al. | |
| 3,183,134 A | 5/1965 | Frisby | |
| 3,442,315 A | 5/1969 | Mirtain | |
| 3,575,227 A | 4/1971 | Bartley | 152/354 |
| 3,672,423 A * | 6/1972 | Duduk | 152/561 X |
| 3,770,041 A | 11/1973 | Abbott | |
| 3,780,783 A * | 12/1973 | Curtiss, Jr. | 152/562 |
| 3,942,574 A | 3/1976 | Bantz | |
| 4,520,856 A | 6/1985 | Pommier | |
| 4,667,721 A | 5/1987 | Cohen et al. | |
| 4,715,420 A | 12/1987 | Kabe et al. | |
| 4,716,951 A | 1/1988 | Suzuki et al. | |
| 4,823,857 A | 4/1989 | Orjela et al. | |
| 4,832,103 A | 5/1989 | Slivka et al. | |
| 4,917,744 A | 4/1990 | Knipp et al. | |
| 5,307,853 A | 5/1994 | Okuda | |
| 6,068,721 A | 5/2000 | Dyer et al. | |
| 6,260,598 B1 | 7/2001 | Tanaka | |
| 6,386,258 B1 | 5/2002 | Dyer et al. | 152/542 |
| 6,571,847 B1 | 6/2003 | Ueyoko | |
| 6,622,766 B1 | 9/2003 | Baldwin, Jr. | |
| 6,796,346 B2 * | 9/2004 | Otsuji et al. | 152/557 X |
| 6,991,017 B2 | 1/2006 | Baldwin, Jr. | |
| 2001/0001971 A1 | 5/2001 | Cottrell | |
| 2001/0042587 A1 | 11/2001 | Caretta et al. | |
| 2004/0060633 A1 | 4/2004 | Panning | |
| 2004/0154727 A1 | 8/2004 | Weissert et al. | |
| 2005/0028915 A1 | 2/2005 | Panning | |
| 2005/0028919 A1 | 2/2005 | Panning | |
| 2006/0162848 A1 | 7/2006 | Weissert et al. | |
| 2006/0219348 A1 | 10/2006 | Girard | |
| 2007/0125471 A1 | 6/2007 | Weissert et al. | |
| 2009/0194215 A1 | 8/2009 | Daghini et al. | |
| 2011/0146871 A1 | 6/2011 | Laske et al. | |
| 2011/0146874 A1 | 6/2011 | Losey et al. | |
| 2011/0146875 A1 | 6/2011 | Losey et al. | |

FOREIGN PATENT DOCUMENTS

| | | |
|---|---|---|
| GB | 237669 A | 8/1925 |
| GB | 786164 A | 11/1957 |
| GB | 810298 A | 3/1959 |
| GB | 848962 A | 9/1960 |
| JP | 4078703 A | 3/1992 |
| JP | 4183612 A | 6/1992 |
| JP | 7096720 A | 4/1995 |

\* cited by examiner

GEODESIC BELTED TIRE

CROSS REFERENCE TO OTHER APPLICATIONS

This application claims the benefit of and incorporates by reference U.S. Provisional Application No. 61/289,777 filed Dec. 23, 2009.

FIELD OF THE INVENTION

The invention is directed to the field of tire manufacturing and tire construction.

BACKGROUND OF THE INVENTION

A geodesic tire is a tire having carcass cords which follow the special mathematical law: $\rho \cos \alpha = \rho_0 \cos \alpha_0 = $ constant. It was found that tires constructed with geodesic plies have unusual crown growth characteristics. Depending upon the specific application of the tire, a special belt package may be needed in order to restrict the crown growth. In addition it may be advantageous in certain tire applications to utilize a geodesic belt in combination with a radial carcass. Thus for the foregoing reasons, it is desired to provide an improved method and apparatus for forming a geodesic tire without the above described disadvantages.

DEFINITIONS

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" means the same as belt or belt structure or reinforcement belts.

"Carcass" means a layer of tire ply material and other tire components. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated cords.

"Radial" and "radially" mean directions radially toward or away from the axis of rotation of the tire.

"Sidewall" means a portion of a tire between the tread and the bead.

"Laminate structure" means an unvulcanized structure made of one or more layers of tire or elastomer components such as the innerliner, sidewalls, and optional ply layer.

BRIEF DESCRIPTION OF THE DRAWINGS

The invention will be described by way of example and with reference to the accompanying drawings in which.

DETAILED DESCRIPTION OF THE INVENTION

Figure 13:
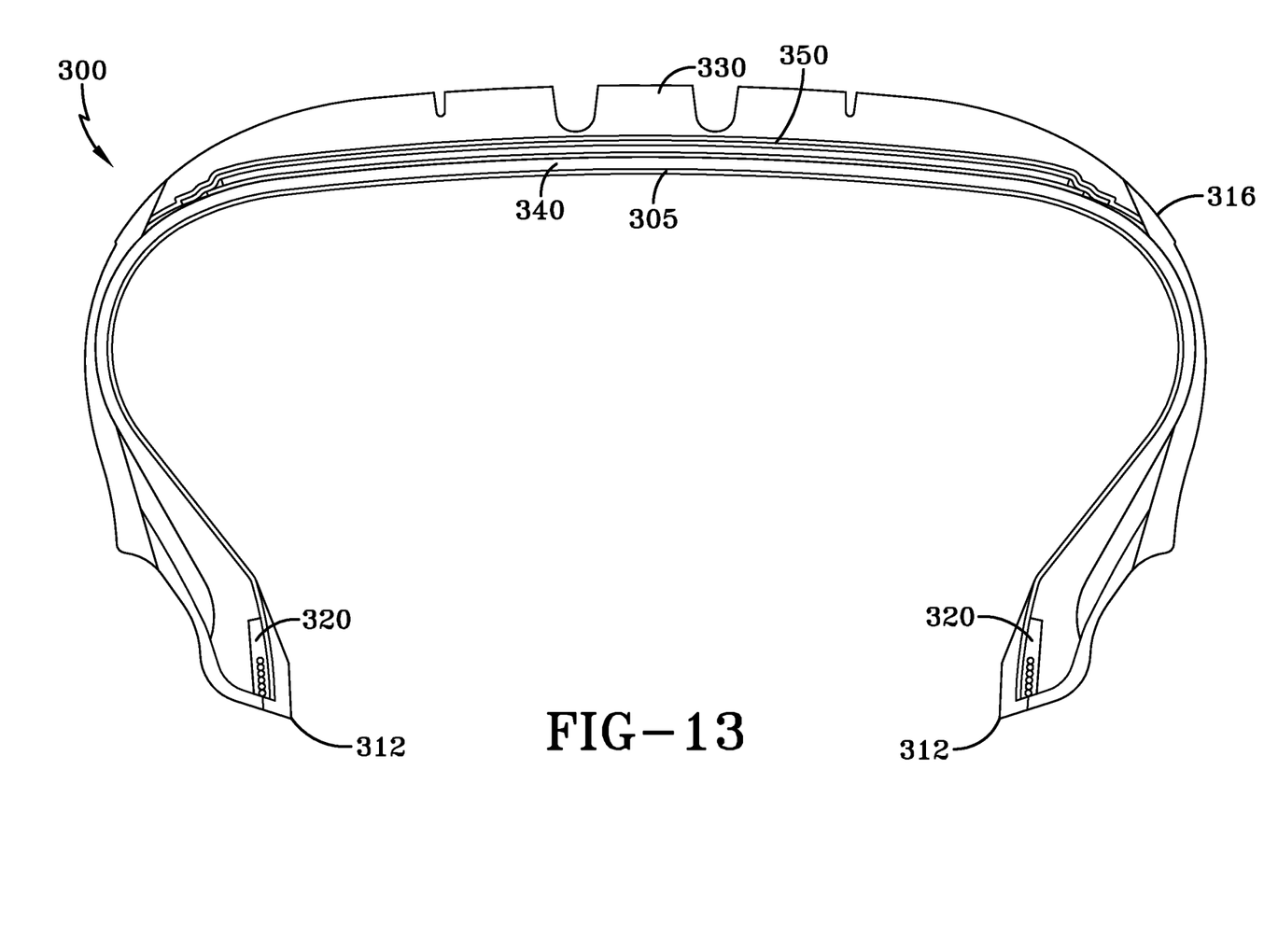
FIG. 13 illustrates a cross-sectional view of a passenger tire of the present invention.

A cross-sectional view of a tire having geodesic cords is shown in FIG. 13. As shown, the tire 300 may be representative of a passenger tire and comprises a pair of opposed bead areas 310, each containing one or more column beads 320 embedded therein. As compared to a tire of the same size, the tire of the present invention has a greatly reduced bead due to the carcass configuration, as described in more detail, below. The tire 300 may further comprise sidewall portions 316 which extend substantially outward from each of the bead portions 312 in the radial direction of the tire. A tread portion 330 extends between the radially outer ends of the sidewall portions 316. Furthermore, the tire 300 is reinforced with a carcass 340 toroidally extending from one of the bead portions 312 to the other bead portion 312. A belt package 350 is arranged between the carcass 330 and the tread. The belt package may be a standard belt package or a geodesic belt package as described in more detail, below.

Figure 1:
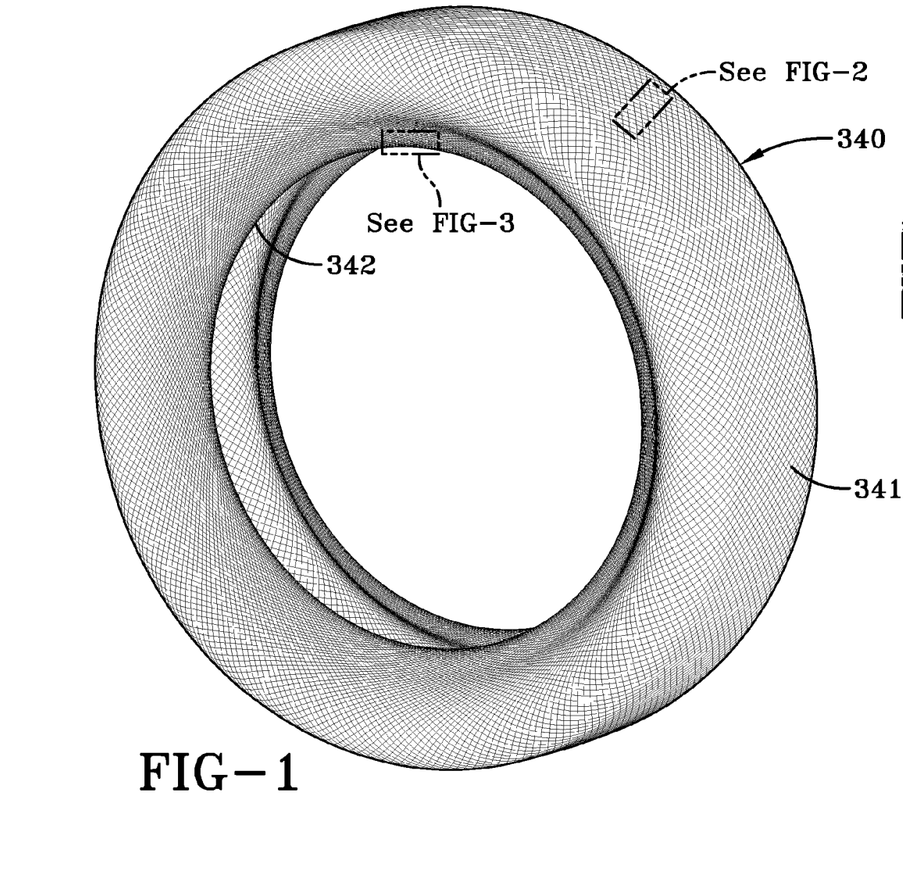
FIG. 1 is a perspective view of a tire carcass having geodesic cords.
Figure 2:
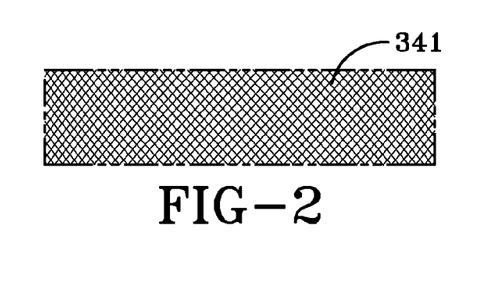
FIG. 2 is a close up view of the cords of the tire carcass in the crown area.
Figure 3:
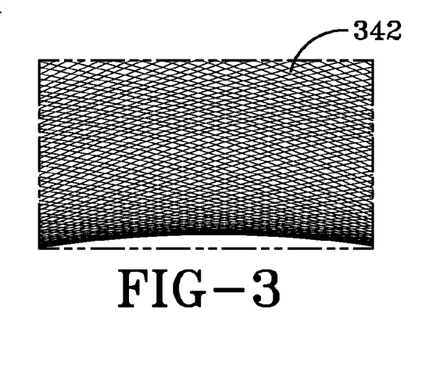
FIG. 3 is a close up view of the cords of the tire carcass in the bead area.

FIGS. 1-3 illustrate the tire carcass 340 of the present invention wherein the cords are arranged in geodesic lines. As shown in FIG. 2, the crown portion 341 of an exemplary passenger tire of size 225 60R16 has spaced apart plies with the angle of about 48 degrees (which varies depending upon the overall tire size). As shown in FIG. 3, the bead area 342 of the tire has closely spaced cords with the cords tangent to the bead. Thus the ply angle continuously changes from the bead core to the crown. A geodesic path on any surface is the shortest distance between two points or the least curvature. On a curved surface such as a torus, a geodesic path is a straight line. A true geodesic ply pattern follows the mathematical equation exactly:

$$\rho \cos \alpha = \rho_0 \cos \alpha_0$$

wherein ρ is the radial distance from the axis of rotation of the core to the cord at a given location;

α is the angle of the ply cord at a given location with respect to the mid-circumferential plane;

$\rho_0$ is the radial distance from the axis of rotation of the core to the crown at the circumferential plane, and $\alpha_0$ is the angle of the ply cord with respect to the tread centerline or midcircumferential plane.

Figure 4A:
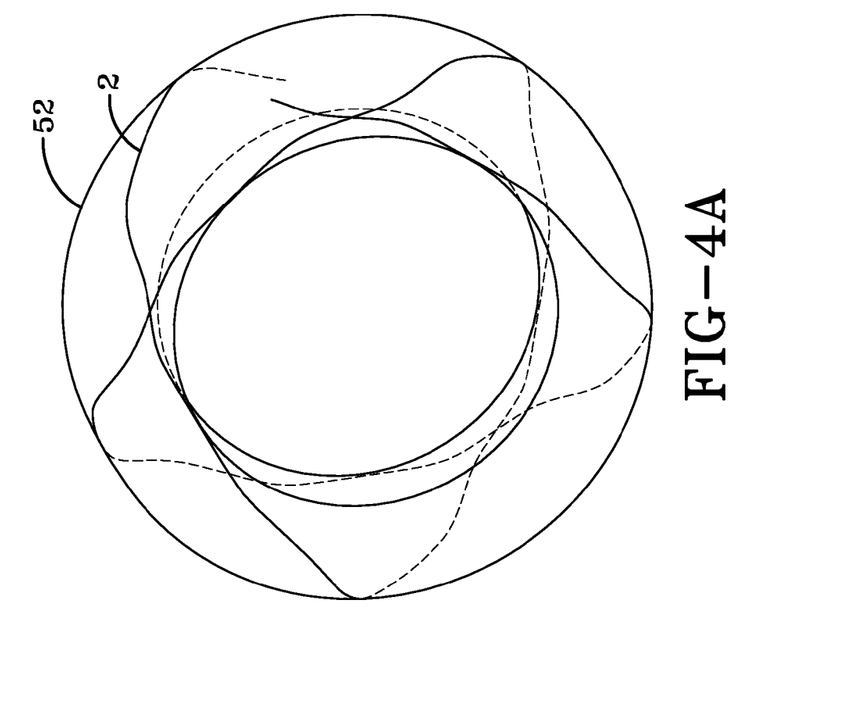
FIG. 4A illustrates the initial cord winding on a tire blank in a geodesic pattern.
Figure 4B:
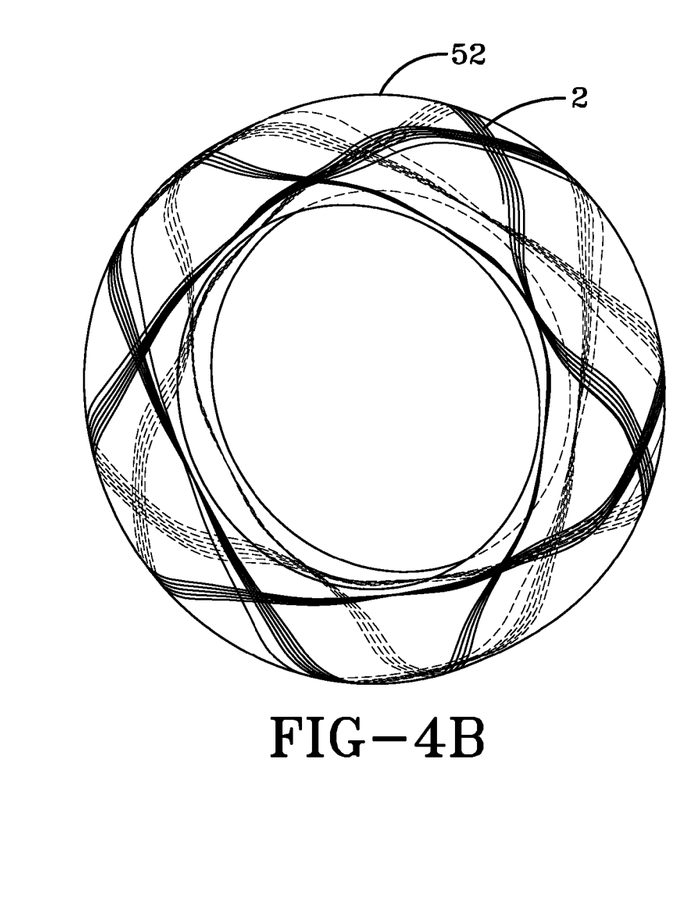
FIG. 4B illustrates the cord winding on a tire blank of FIG. 5a after multiple passes.
Figure 5:
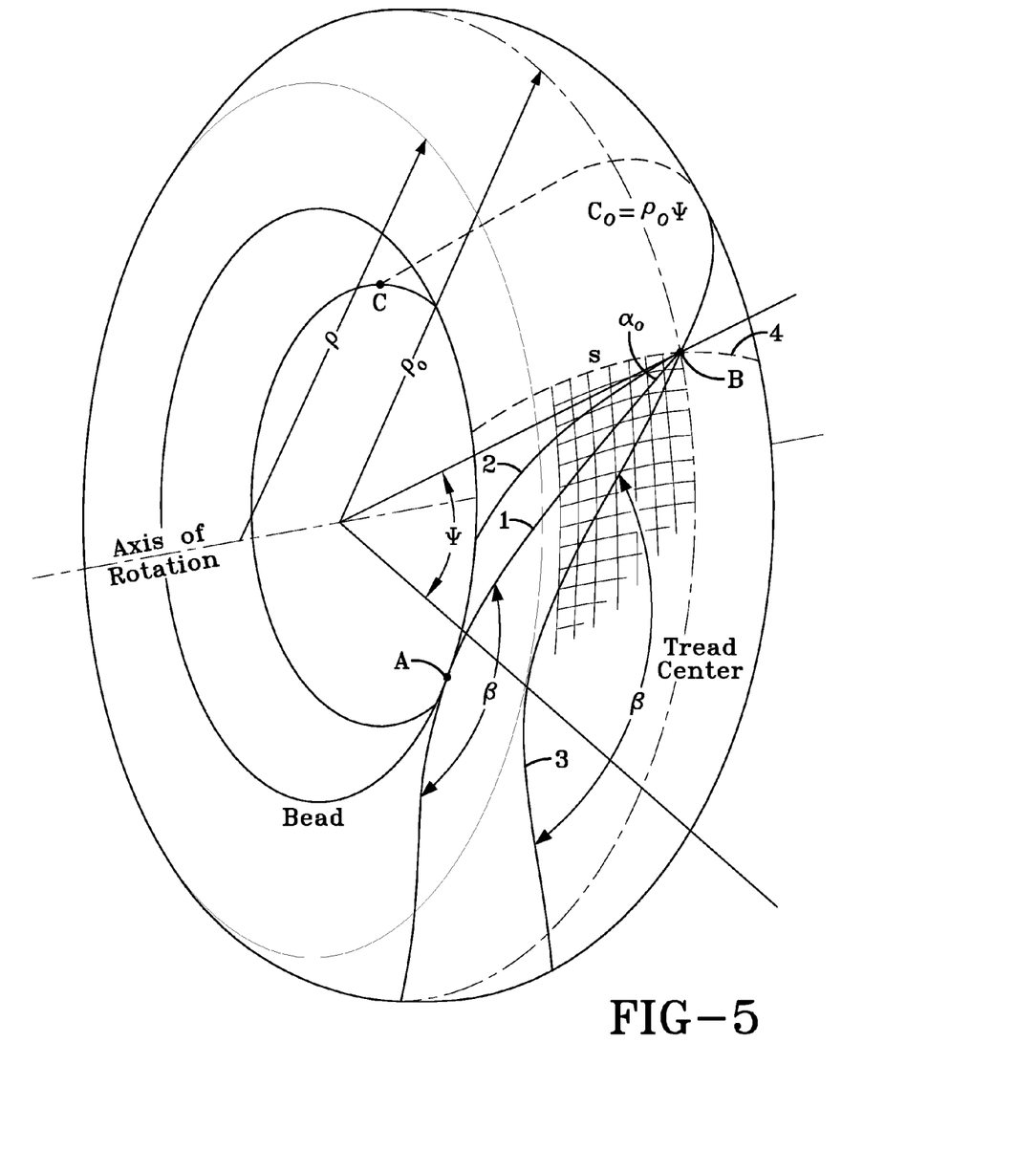
FIG. 5 illustrates various geodesic curves.
Figure 6:
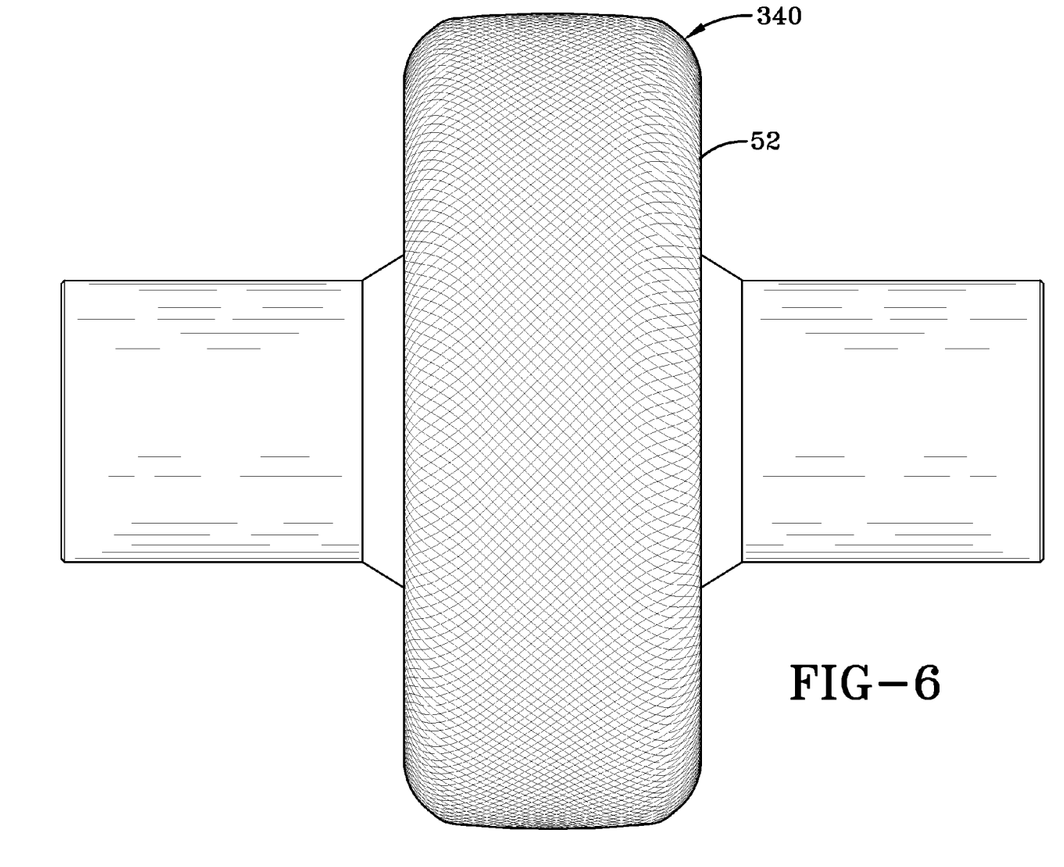
FIG. 6 illustrates a front view of a tire carcass having geodesic cords of the present invention.
Figure 7:
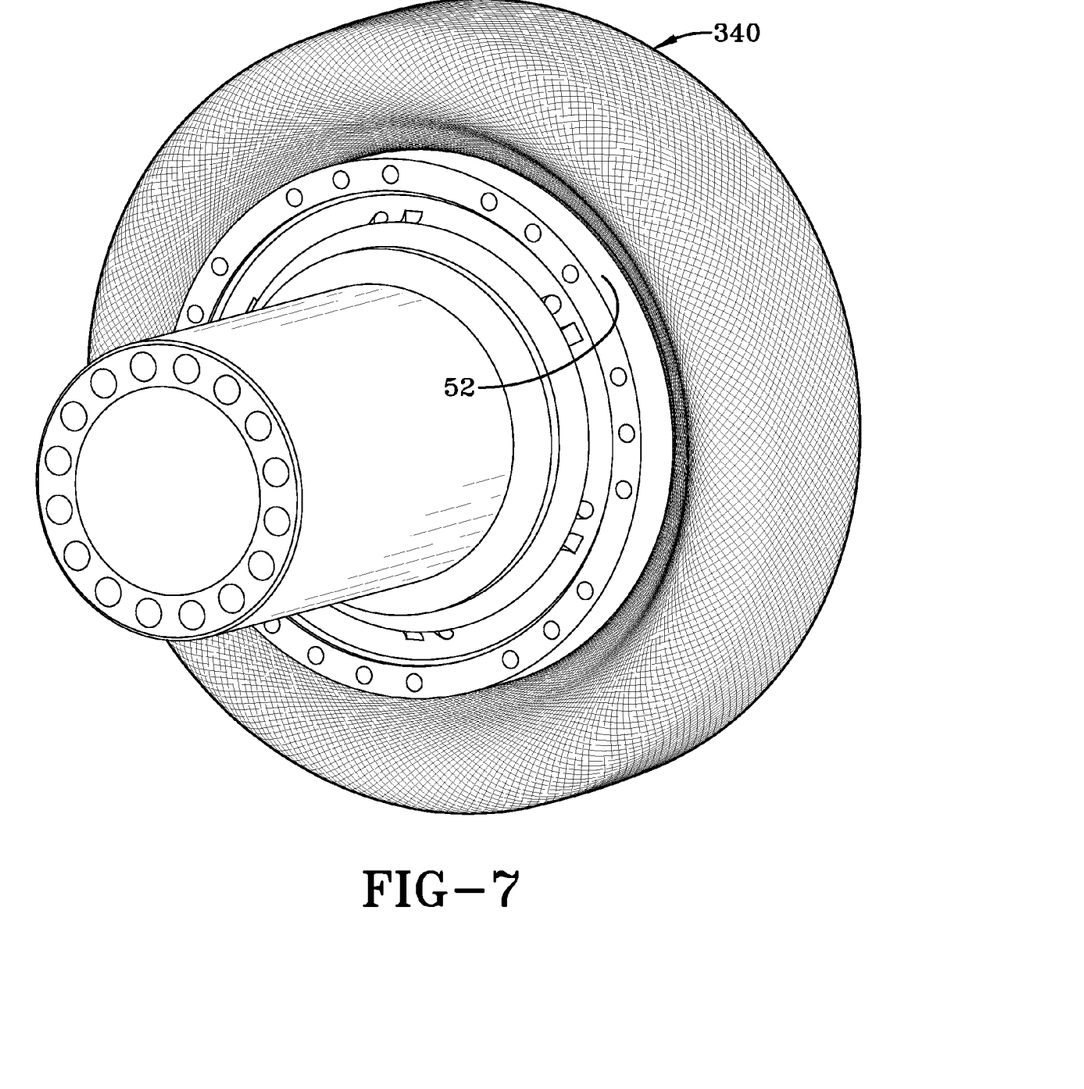
FIG. 7 illustrates a side view of the carcass of FIG. 7.
Figure 8:
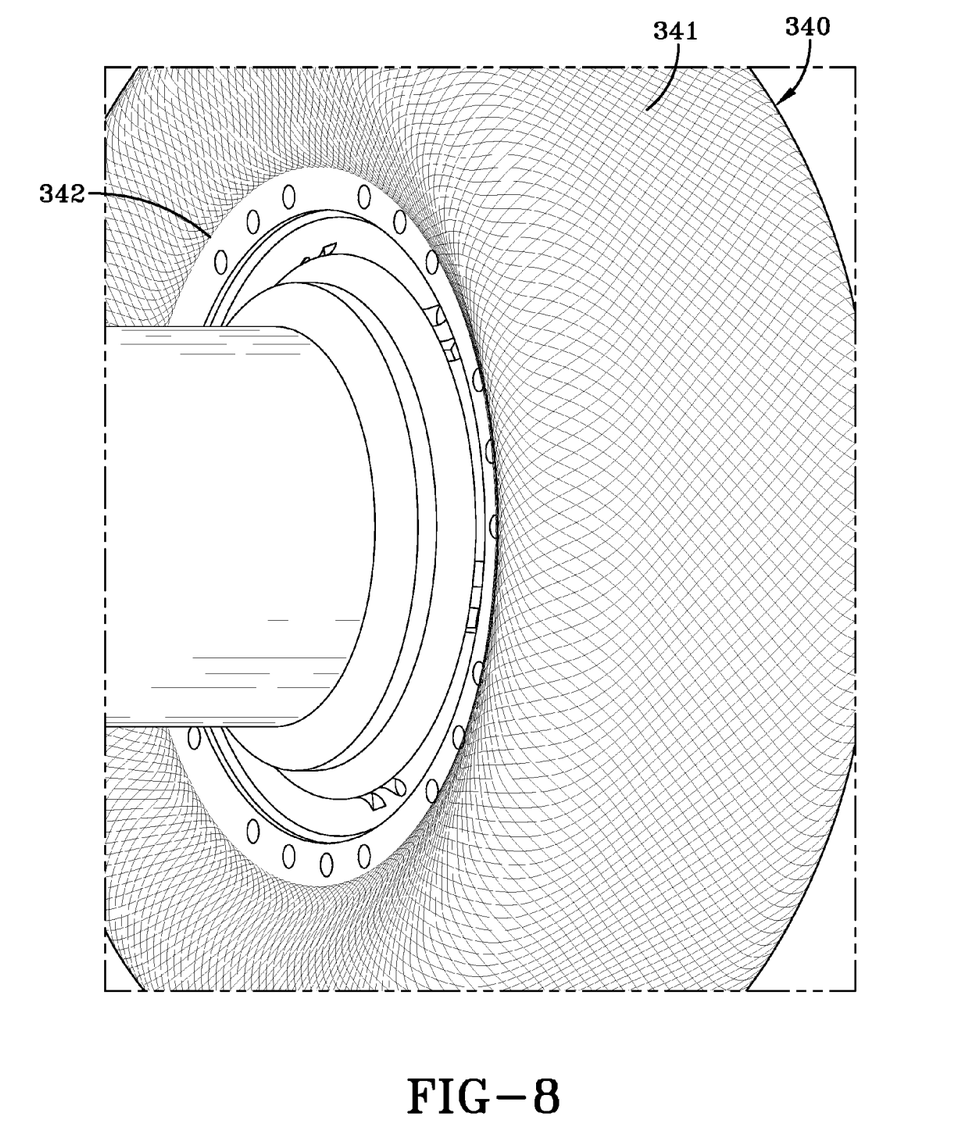
FIGS. 8 and 9 illustrate a close up perspective view of the bead area of the carcass of FIG. 7.
Figure 9:
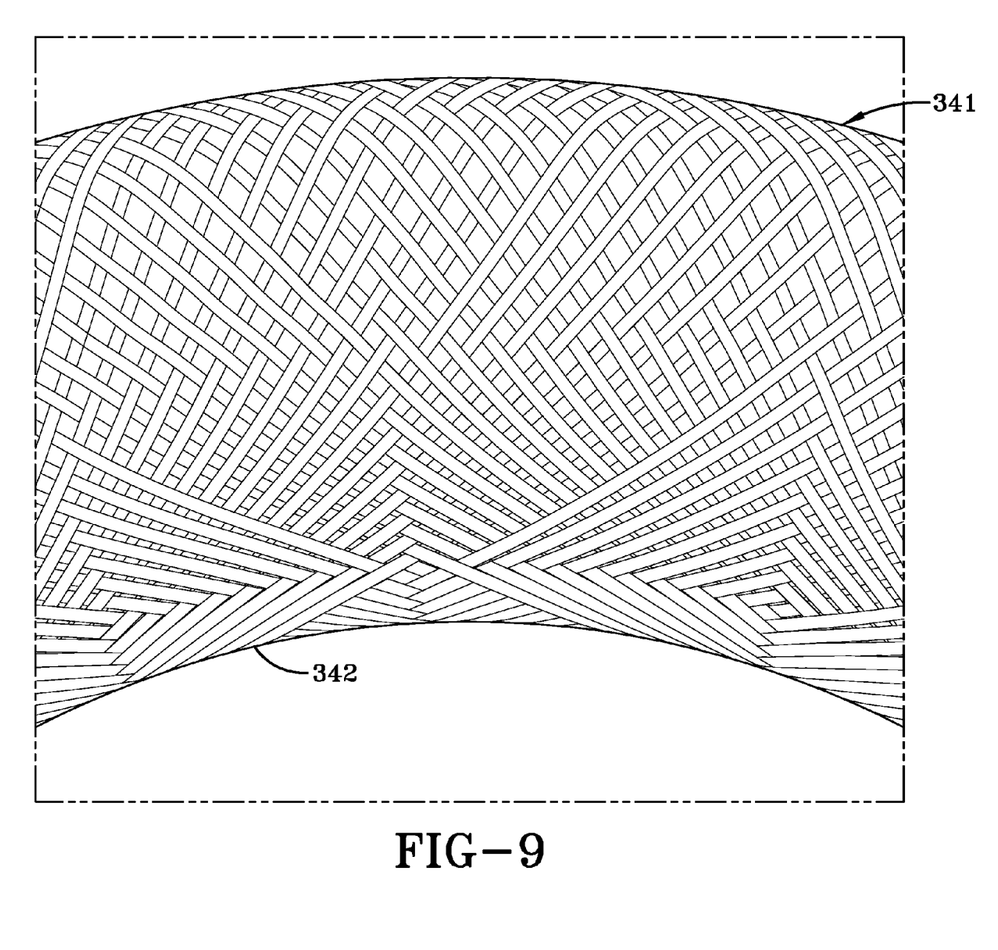

FIG. 5 illustrates several different ply path curves of a tire having geodesic cords. One well known embodiment of a geodesic tire is the radial tire and is shown as curve 4, wherein the cords have an angle α of 90 degrees with respect to the circumferential plane. Curves 1, 2 and 3 of FIG. 5 also illustrate other geodesic cord configurations. Curve 1 is a special case of a geodesic cord pattern wherein the cord is tangent to the bead circle, and is referred to herein as an orbital ply. FIGS. 4A-4B illustrate a carcass 340 having an orbital ply configuration and in various stages of completion. For curve 1 of FIG. 5, the following equation applies:

At ρ=ρbead, the angle α is zero because the cords are tangent to the bead.

$$\alpha = \cos^{-1}(\rho_{bead}/\rho)$$

FIGS. 6-9 illustrate a first embodiment of a green tire carcass of the present invention. The tire is illustrated as a passenger tire, but is not limited to same. The cords of the carcass are arranged in a geodesic orbital pattern wherein the cords are tangent to the bead radius of the tire. The close proximity of the cords results in a very large buildup of cord material in the bead area. In order to overcome this inherent disadvantage, the inventors modified the ply layup as described in more detail, below.

Apparatus

Figure 10:
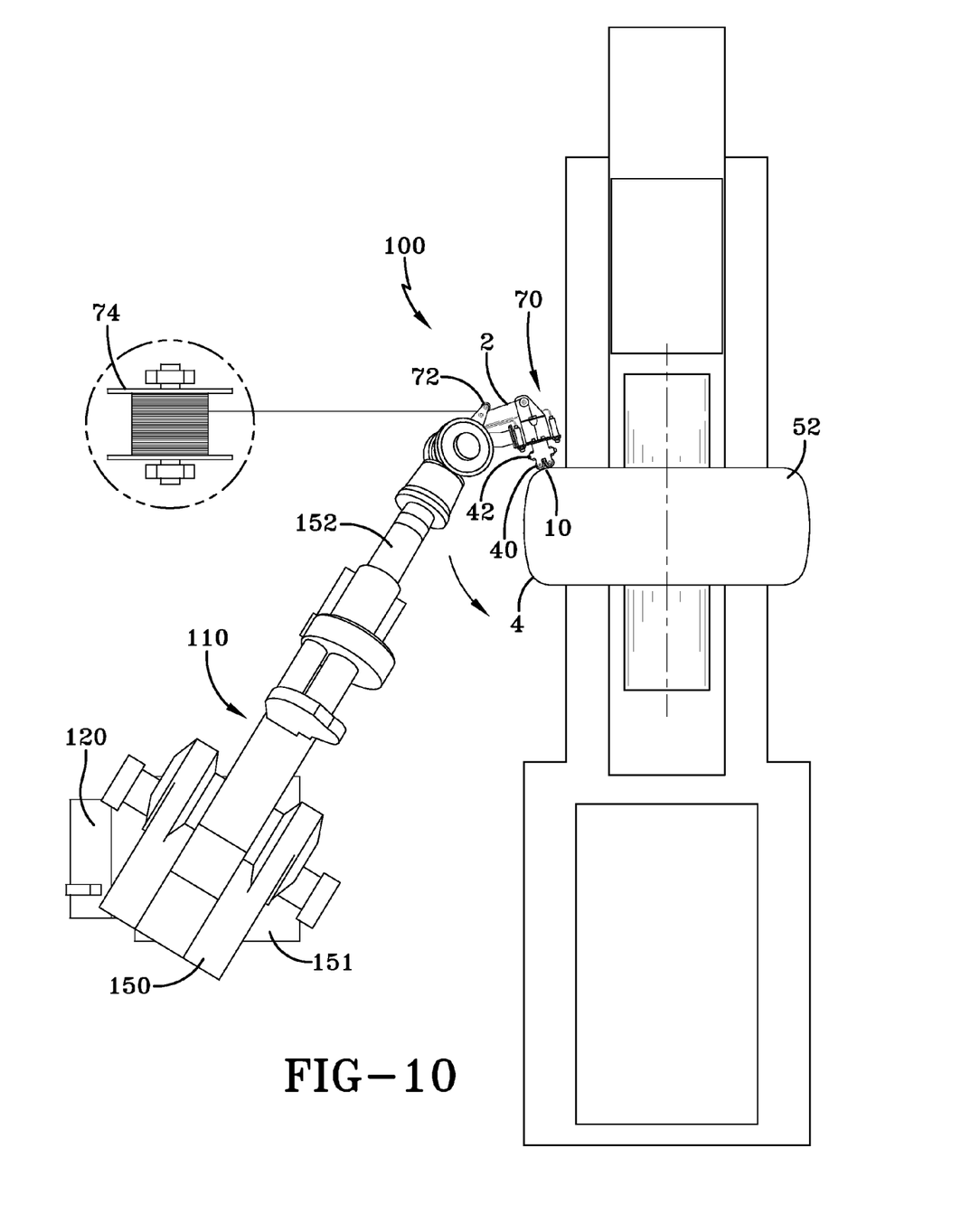
FIGS. 10-11 illustrate a first embodiment of an apparatus for laying ply on a tire blank.
Figure 11:
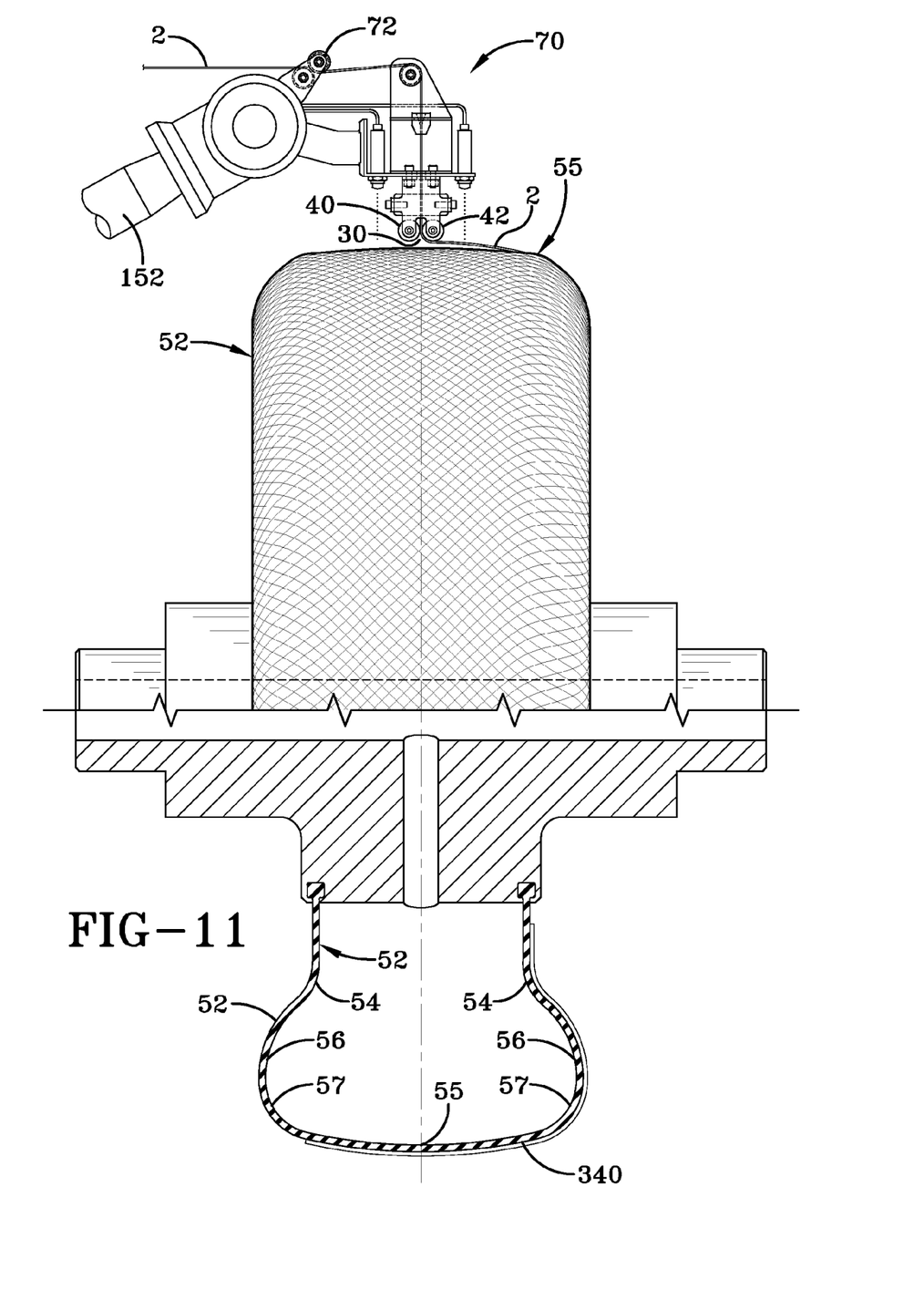

In a first embodiment of the invention, the tire 300 having a geodesic carcass is formed on a torus shaped core or tire blank 52. The core 52 may be in the shape of a cylinder such as a tire building drum, but is preferably shaped to closely match the inner shape of the tire. The core is rotatably mounted about its axis of rotation and is shown in FIGS. 10 and 11. The core may be collapsible or formed in sections for ease of removal from the tire. The core may also contain internal heaters to partially vulcanize the inner liner on the core.

Next, an inner liner 305 is applied to the core. The inner liner may be applied by a gear pump extruder using strips of rubber or in sheet form or by conventional methods known to those skilled in the art. An optional bead, preferably a column bead 320 of 4 or more wires may be applied in the bead area over the inner liner.

Next, a strip of rubber having one or more rubber coated cords 2 is applied directly onto the core over the inner liner as the core is rotated. With reference to FIGS. 10-11, a perspective view of an apparatus 100 in accordance with the present invention is illustrated. As shown the apparatus 100 has a guide means which has a robotic computer controlled system 110 for placing the cord 2 onto the toroidal surface of core 52. The robotic computer controlled system 110 has a computer 120 and preprogrammed software which dictates the ply path to be used for a particular tire size. Each movement of the system 110 can be articulated with very precise movements.

The robot 150 which is mounted on a pedestal 151 has a robotic arm 152 which can be moved in preferably six axes. The manipulating arm 152 has a ply mechanism 70 attached as shown. The robotic arm 152 feeds the ply cord 2 in predetermined paths 10. The computer control system coordinates the rotation of the toroidal core 52 and the movement of the ply mechanism 70.

The movement of the ply mechanism 70 permits convex curvatures to be coupled to concave curvatures near the bead areas thus mimicking the as molded shape of the tire.

With reference to FIG. 11, a cross-sectional view of the toroidal core 52 is shown. As illustrated, the radially inner portions 54 on each side 56 of the toroidal mandrel 52 have a concave curvature that extends radially outward toward the crown area 55 of the toroidal mandrel 52. As the concave cross section extends radially outward toward the upper sidewall portion 57, the curvature transitions to a convex curvature in what is otherwise known as the crown area 55 of the toroidal mandrel 52. This cross section very closely duplicates the molded cross section of a tire.

To advance the cords 2 on a specified geodesic path 10, the mechanism 70 may contain one or more rollers. Two pairs of rollers 40, 42 are shown with the second pair 42 placed 90° relative to the first pair 40 and in a physical space of about one inch above the first pair 40 and forms a center opening 30 between the two pairs of rollers which enables the cord path 10 to be maintained in this center. As illustrated, the cords 2 are held in place by a combination of embedding the cord into the elastomeric compound previously placed onto the toroidal surface and the surface tackiness of the uncured compound. Once the cords 2 are properly applied around the entire circumference of the toroidal surface, a subsequent lamination of elastomeric topcoat compound (not shown) can be used to complete the construction of the ply 20.

The standard tire components such as chafer, sidewall, and tread may be applied to the carcass and the tire cured in a conventional mold. The tire may further include an optional bead having a significantly reduced area and weight. One example of a bead suitable for use with the tire of the invention comprises a column bead having ⅔ reduction in weight as the standard tire.

Figure 12:
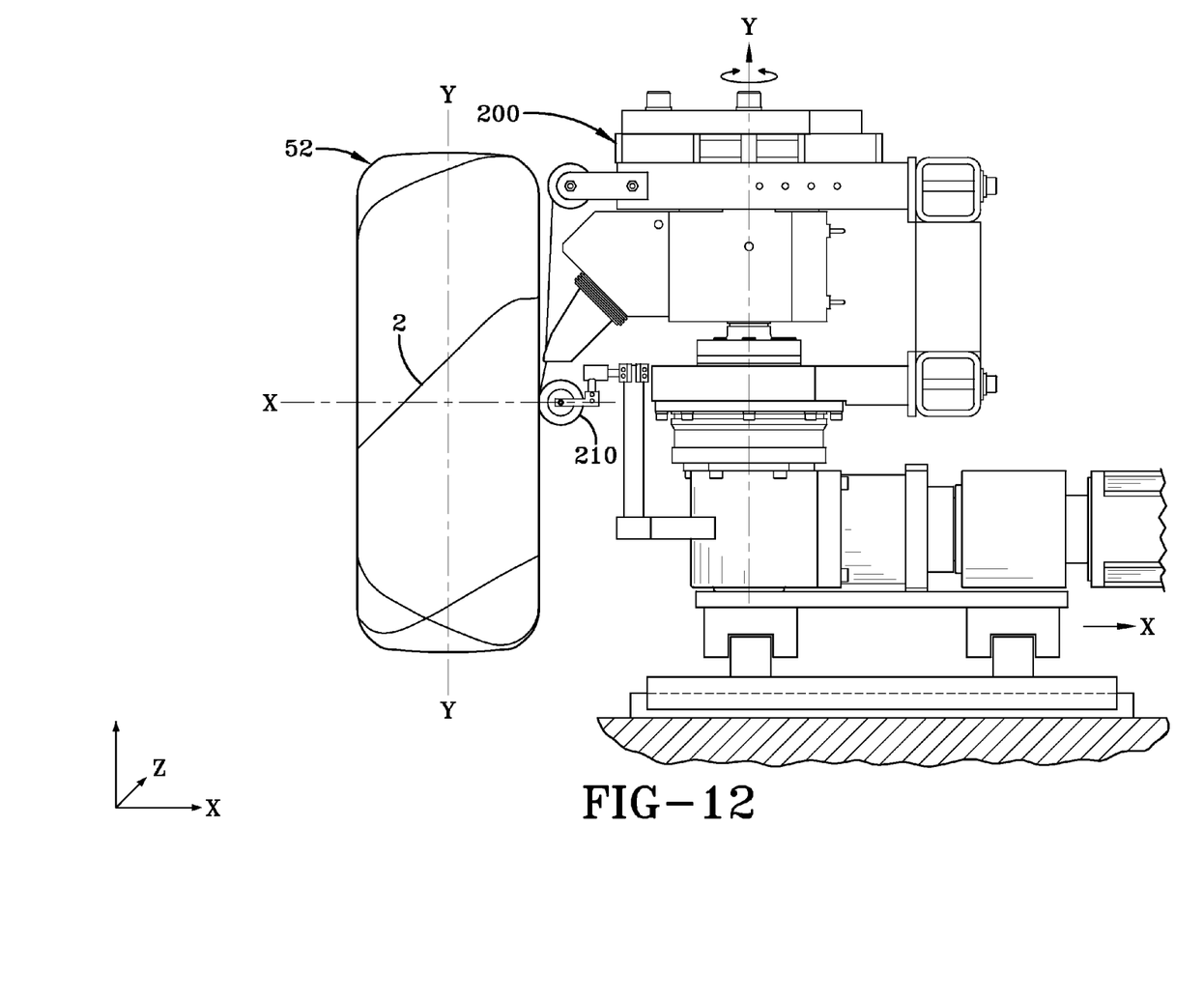
FIG. 12 illustrates a second embodiment of an apparatus for laying ply on a tire blank.

A second embodiment of an apparatus suitable for applying ply in a geodesic pattern onto a core is shown in FIG. 12. The apparatus includes a ply applier head 200 which is rotatably mounted about a Y axis. The ply applier head 200 can rotate about the Y axis +/−100 degrees. The rotation of the ply applier head 200 is necessary to apply the cord in the shoulder and bead area. The ply applier head 200 can thus rotate about rotatable core 52 on each side in order to place the ply in the sidewall and bead area. The ply applier head 200 is mounted to a support frame assembly which can translate in the X, Y and Z axis. The ply applier head has an outlet 202 for applying one or more cords 2. The cords may be in a strip form and comprise one or more rubber coated cords. Located adjacent the ply applier head 200 is a roller 210 which is pivotally mounted about an X axis so that the roller can freely swivel to follow the cord trajectory. The ply applier head and stitcher mechanism are precisely controlled by a computer controller to ensure accuracy on placement of the ply. The tire core is rotated as the cord is applied. The tire core is rotated discontinuously in order to time the motion of the head with the core. The ply applier head and stitcher apparatus is specially adapted to apply cord to the sidewalls of the tire core and down to and including the bead area.

The strip of rubber coated cords are applied to the core in a pattern following the mathematical equation ρ cos α=constant. FIG. 5 illustrates ply curves 1, 2, and 3 having geodesic ply paths. Curves 2 and 3 illustrate an angle β, which is the angle the ply makes with itself at any point. For the invention, the ply angle β is selected to be in the range strictly greater than 90 degrees to about 180 degrees. Preferably, the geodesic path (or orbital path) of the invention is ply curve 2 with β about equal to 180 degrees. For ply curve 2, if a point on the curve is selected such as point A, the angle of ply approaching point A will be equal to about 180 degrees. Likewise, the angle of the ply going away from point A will also be about 180 degrees. Thus for any point on curve 2, the angle of ply approaching the point and leaving the point will be about 180 degrees, preferably substantially 180 degrees.

As shown in FIG. 5, the angle $\alpha_0$ is selected so that the cord is tangent to the bead. Starting at a point A, the cord is tangent to the bead. Curve 1 of FIG. 5 illustrates the cord path from point A to the center crown point B, which is an inflection point. The cord continues to the other side of the tire wherein the cord is tangent at point C. The process is repeated until there is sufficient coverage of the core. Depending on the cord size and type selection, the cords are wound for 300 to 450 revolutions to form the carcass. Since the cords are tangent to the bead at multiple locations, the build up of the cords in the bead area form a bead.

As described above, the ply cords are applied to the core in a pattern following the mathematical equation $\rho \cos \alpha$=constant. Using a three dimensional grid of data points of the core, a calculation of all of the discrete cord data points satisfying the mathematical equation $\rho \cos \alpha$=constant may be determined. The three dimensional data set of the core is preferably X,Y,Ψ coordinates, as shown in FIG. 5. A starting point for the calculation is then selected. The starting point is preferably point A of FIG. 5, which is the point of tangency of the cord at the bead location. An ending point is then selected, and is preferably point C of FIG. 5. Point C represents the point of tangency on the opposite side of the tire compared to point A. Next the change in Ψ is calculated from point A to point C. The desired cord path from the starting point A to ending point C is then determined from the three dimensional data set using a method to determine the minimum distance from point A to point C. Preferably, dynamic programming control methodology is used wherein the three dimensional minimum distance is calculated from point A to point C. A computer algorithm may be used which calculates each distance for all possible paths of the three dimensional data set from point A to point C, and then selects the path of minimal distance. The path of minimum distance from point A to point C represents the geodesic path. The discrete data points are stored into an array and used by the computer control system to define the cord path. The process is them repeated from point C to the next point of tangency and repeated until sufficient coverage of the carcass occurs.

Geodesic Ply with Indexing

In a variation of the invention, all of the above is the same except for the following. The strip is applied starting at a first location in a first continuous strip conforming exactly to $\rho \cos \alpha$=constant for N revolutions. N is an integer between 5 and 20, preferably 8 and 12, and more preferable about 9. After N revolutions, the starting point of the strip for the second continuous strip is moved to a second location which is located adjacent to the first location. The strip is not cut and remains continuous, although the strip could be cut and indexed to the starting location. The above steps are repeated until there is sufficient ply coverage, which is typically 300 or more revolutions. The inventors have found that this small adjustment helps the ply spacing to be more uniform.

Radius Variation

In yet another variation of the invention, all of the above is the same except for the following. In order to reduce the buildup at the bead area, the radius ρ is varied in the radial direction by +/− delta in the bead area of the tire on intervals of Q revolutions. Delta may range from about 2 mm to about 20 mm, more preferably from about 3 to about 10 mm, and most preferably about 4 to about 6 mm. The radius is preferably varied in a randomized fashion. Thus for example, if Q is 100, then for every 100 revolutions, the radius may be lengthened about 5 mm, and in the second 100 revolutions, the radius may be shortened about 5 mm.

Another way of varying the radius is at every Qth revolution, the radius is adjusted so that the point of tangency is incrementally shortened by gamma in the radial direction, wherein gamma varies from about 3 mm to about 10 mm. Q may range from about 80 to about 150, and more preferably from about 90 to about 120 revolutions. Thus for example, Q may be about 100, and gamma may be about 5 mm. Thus for every 100 revolutions, the radius may be shortened by 5 mm in the radial direction. The variation of the radius may be preferably combined with the indexing as described above.

Axial Variation

In yet another variation, all of the above is the same as described in any of the above embodiments, except for the following. In order to account for the buildup at the bead area, the cord axial dimension is increased in the bead area. Thus there is a deviation in the geodesic equation at the bead area. In the vicinity of the bead area, wherein ρ is <some value, a new X value is calculated to account for the buildup of material in the bead area. A new X value is calculated based upon the cord thickness. The new X value may be determined using a quadratic equation. The ρ and α values remain unchanged.

Dwell Variation

In yet another variation, all of the above is the same as described in any of the above embodiments, except for the following. In order to reduce the buildup at the bead area, a dwell angle Ψ is utilized. Thus instead of there being one point of tangency at the bead, the angle Ψ is dwelled a small amount on the order of 5 about degrees or less while the other variables remain unchanged. The dwell variation is useful to fill in gaps of the cord in the bead area.

Cord Construction

The cord may comprise one or more rubber coated cords which may be polyester, nylon, rayon, steel, flexten or aramid.

Geodesic Belt Construction

Figure 14:
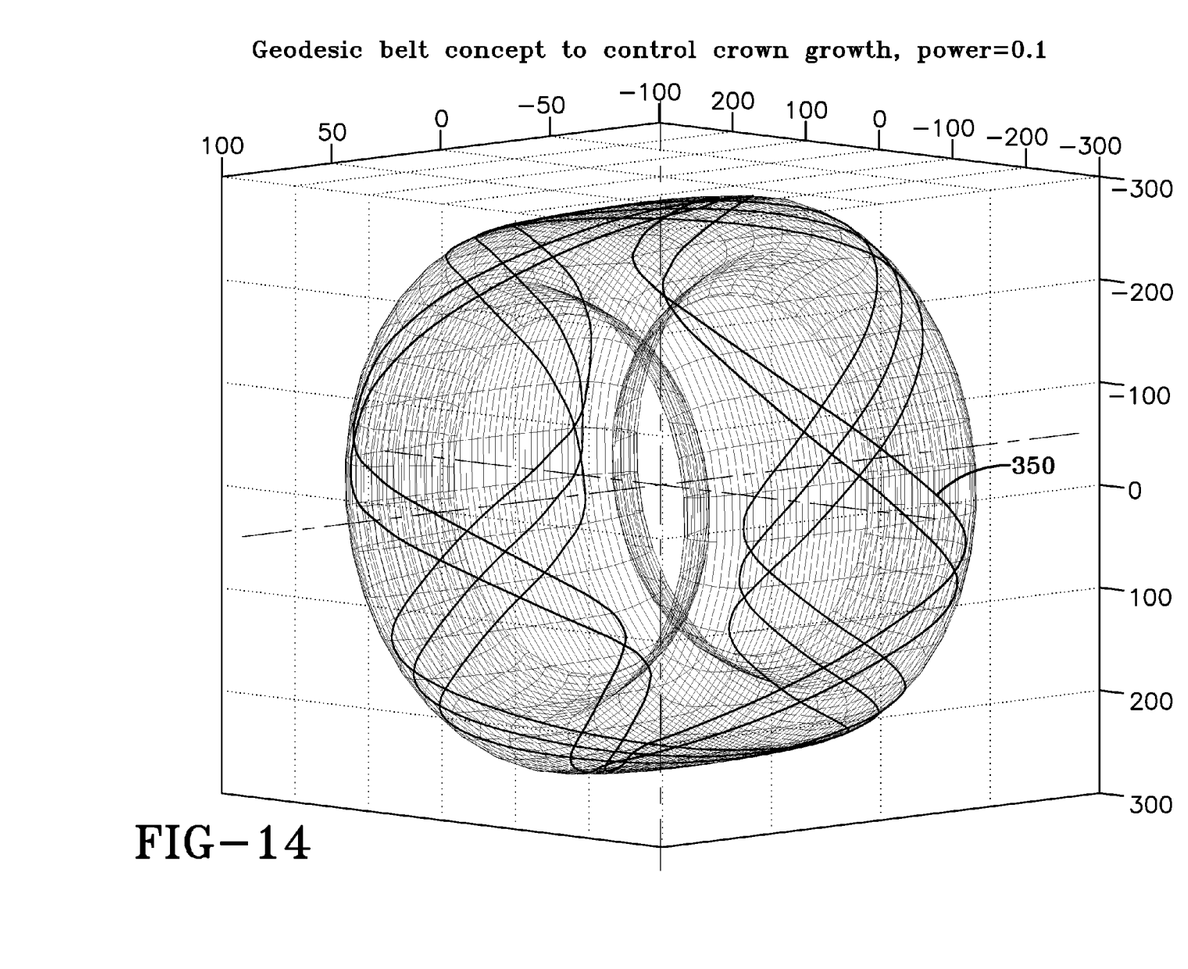
FIG. 14 illustrates a perspective view of an exemplary geodesic belt.

The crown area of a carcass having a geodesic ply as described above may further include a geodesic belt 350. The geodesic belt is located in the crown portion of the tire under the tread. One or more geodesic belts may be applied over the geodesic carcass or a prior art radial carcass. The geodesic belt may follow the equation $\rho \cos \alpha$=constant. The belt may be applied over the carcass using the manufacturing methods described above. In the one embodiment, the belt cords have filaments formed of aramid and polyester.

The one or more geodesic belts may also have the following power law equation:

$$\rho[\cos \alpha]^n = \text{constant, wherein} \quad (1)$$

$$0 < n < 1 \quad (2)$$

$$\text{Constant} = \rho_o[\cos \alpha_o]^n \quad (3)$$

If the carcass of the tire is geodesic, it is preferred that n be in the range of about 0.1 to about 0.3.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire having a pair of beads, a tread, a pair of sidewalls, and a carcass including a plurality of plies of tire cord fabric, said tire having one or more belt plies radially outward of said carcass, wherein at least one of said belt plies has cords being defined by the equation $\rho[\cos \alpha]^n = K$, when $\rho$ is the radius from the rotational axis of the tire to a point on the respective at least one of said belt plies, $\alpha$ is the cord angle of said at least one of said belt plies at said point, n is a positive real number greater than 0.1 and less than 1, and K is a constant.

2. The pneumatic tire of claim 1 wherein the carcass has radial cords.

3. The pneumatic tire of claim 1 wherein n is equal to 0.1.

4. The pneumatic tire of claim 1 wherein the cords in both the carcass and the at least one of said belt plies are aramid.

5. The pneumatic tire of claim 1 wherein the cords in both the carcass and the at least one of said belt plies are polyester.

6. The pneumatic tire of claim 1 wherein the pneumatic tire further comprises two column beads.

7. The pneumatic tire of claim 1 wherein the one or more belt plies is formed of a single continuous cord.

8. The pneumatic tire of claim 7 wherein an angle $\beta$ of the single continuous cord is in the range of: strictly greater than 90 degrees to 180 degrees.

9. The pneumatic tire of claim 1 wherein the one or more belt plies is formed from a continuous strip of one or more reinforcement cords.

10. The pneumatic tire of claim 9 wherein an angle $\beta$ of the continuous strip with respect to itself is 180 degrees.

11. The pneumatic tire of claim 1 wherein the cords in the at least one of said belt plies are aramid.

12. The pneumatic tire of claim 1 wherein the cords in the at least one of said belt plies are polyester.

13. The pneumatic tire of claim 1 wherein the cords in the at least one of said belt plies have filaments formed of aramid and polyester.

14. A pneumatic tire having a pair of beads, a tread, a pair of sidewalls, and a carcass including a plurality of plies of tire cord fabric, said tire having one or more belt plies, wherein at least one of said belt plies has cords being defined by the equation $\rho[\cos \alpha]^n = K$, when $\rho$ is the radius from the rotational axis of the tire to a point on the respective at least one of said belt plies, $\alpha$ is the cord angle of said at least one of said belt plies at said point, n is a positive real number greater than 0.1 and less than 0.3, and K is a constant.

\* \* \* \* \*